(12) United States Patent
Miyano et al.

(10) Patent No.: US 10,115,206 B2
(45) Date of Patent: Oct. 30, 2018

(54) DETECTION SYSTEM, DETECTION METHOD, AND PROGRAM STORAGE MEDIUM

(71) Applicant: NEC Corporation, Minato-ku, Tokyo (JP)

(72) Inventors: Hiroyoshi Miyano, Tokyo (JP); Tetsuaki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/315,413

(22) PCT Filed: Jun. 2, 2015

(86) PCT No.: PCT/JP2015/002775
§ 371 (c)(1),
(2) Date: Dec. 1, 2016

(87) PCT Pub. No.: WO2015/186347
PCT Pub. Date: Dec. 10, 2015

(65) Prior Publication Data
US 2017/0186179 A1    Jun. 29, 2017

(30) Foreign Application Priority Data
Jun. 3, 2014   (JP) ................. 2014-115207

(51) Int. Cl.
*G06K 9/00* (2006.01)
*G06T 7/254* (2017.01)
(Continued)

(52) U.S. Cl.
CPC ............... *G06T 7/254* (2017.01); *G06T 7/20* (2013.01); *G06T 7/215* (2017.01); *G08B 13/196* (2013.01); *H04N 7/18* (2013.01)

(58) Field of Classification Search
CPC ........... G06T 7/254; G06T 7/215; G06T 7/20; G08B 13/196; H04N 7/18
(Continued)

(56) References Cited

U.S. PATENT DOCUMENTS

2008/0247599 A1* 10/2008 Porikli ............... G06K 9/00771
382/103
2011/0164185 A1* 7/2011 Park ........................ G06T 7/254
348/586
(Continued)

FOREIGN PATENT DOCUMENTS

JP       2011-198244 A   10/2011
JP        5058010 B2     10/2012

OTHER PUBLICATIONS

Atsushi Kawabata, Shinya Tanifuji, Yasuo Morooka, "An Image Extraction Method for Moving Object", Information Processing Society of Japan, vol. 28, No. 4, pp. 395-402, 1987.
(Continued)

*Primary Examiner* — Van D Huynh (57) ABSTRACT

A detection system which detects a mobile object includes: an image input unit for receiving an input of a plurality of image frames having different capturing times; an inter-background model distance calculation unit for calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and a mobile object detection unit for detecting a first region in an image frame.

15 Claims, 5 Drawing Sheets

(51) Int. Cl.
G06T 7/20 (2017.01)
H04N 7/18 (2006.01)
G06T 7/215 (2017.01)
G08B 13/196 (2006.01)

(58) Field of Classification Search
USPC .......................................................... 382/103
See application file for complete search history.

(56) References Cited

U.S. PATENT DOCUMENTS

2013/0050502 A1* 2/2013 Saito .................. G06T 7/20
348/169
2016/0277397 A1* 9/2016 Watanabe ........... H04L 63/0861
2016/0371827 A1* 12/2016 Zhuang .................... G06T 7/20

OTHER PUBLICATIONS

C. Stauffer and W.E.L. Grimson, "Adaptive background mixture models for real-time tracking", Proceedings of CVPR, The Artificial Intelligence Laboratory, Massachusetts Institute of Technology, Cambridge, MA, USA, vol. 2, pp. 246-252, 1999.
International Search Report for PCT Application No. PCT/JP2015/002175, dated Aug. 4, 2015.
English translation of Written opinion for PCT Application No. PCT/JP2015/002775.

* cited by examiner

DETECTION SYSTEM, DETECTION METHOD, AND PROGRAM STORAGE MEDIUM

This application is a National Stage Entry of PCT/JP2015/002775 filed on Jun. 2, 2015, which claims priority from Japanese Patent Application 2014-115207 filed on Jun. 3, 2014, the contents of all of which are incorporated herein by reference, in their entirety.

TECHNICAL FIELD

Some aspects of the present invention relate to an image processing system, an image processing method, and a program storage medium.

BACKGROUND ART

In recent years, in the application of video surveillance or the like, needs for detecting and tracking a mobile object such as a person or a vehicle are increasing. With such increasing needs, many techniques for detecting a mobile object and tracking the detected mobile object have been proposed. A mobile object herein is not limited to an object which continues to move among objects appeared on an image, and also includes an object which "temporarily stops" (also referred to as "rests" or "loiters"). In other words, a mobile object generally means an object appeared on an image except a portion regarded as a background. For example, a person or a vehicle which is a common target to be monitored by video surveillance is moving not all the time, but has a state of resting such as temporarily stopping or parking. For this reason, it is important in applications such as video surveillance that an object can be detected even when the object temporarily stops.

As a method of detecting a mobile object, a background difference method is known (see, for example, Non Patent Literature 1 and Non Patent Literature 2). The background difference method is a method in which an image stored as a background is compared with an image captured by a camera to extract a region having a difference as a mobile object. Here, when the mobile object is detected by using a background difference, an accurate background extraction is required at the time of analysis. This is because, when data at the start of measurement is simply used as a background fixedly, many error detections occur, caused by influence of a change of the background due to an environmental change such as a change of illumination. Accordingly, in order to avoid such problems, usually, a background at the time of analysis is performed by a method such as calculating a mean value for each pixel from images observed within the latest time period. For example, Non Patent Literature 1 discloses a method of applying a background difference method while performing an update of a background successively.

On the other hand, there is also a technique in which only an object which temporarily rests such as a left object or a person who loiters for a predetermined time is extracted (see, for example, Patent Literature 1). Patent Literature 1 discloses a method in which a motion in a scene is analyzed by a plurality of background models having different time spans. In the method, a long-term background model which is analyzed using a long time range and a short-term background model which is analyzed using a short time range are generated. When a mobile object is not detected by the background difference based on the short-term background model and is detected by the background difference based on the long-term background model for a predetermined times, the mobile object is then detected as being a temporarily stationary object.

CITATION LIST

Patent Literature

[PTL 1] Patent No. 5058010

Non Patent Literature

[NPL 1] KAWABATA ATSUSHI, TANIFUJI SHINYA, MOROOKA YASUO. "An Image Extraction Method for Moving Object", Information Processing Society of Japan, vol.28, no.4, pp.395-402, 1987

[NPL 2] C. Stauffer and W. E. L. Grimson, "Adaptive background mixture models for real-time tracking", Proceedings of CVPR, vol.2, pp. 246-252, 1999

SUMMARY OF INVENTION

Technical Problem

As described in Non Patent Literature 1, a case in which a mobile object such as a person or a vehicle stays for a longer time than a time span for analyzing a background image in a method of extracting a difference between a successively updated background image and an image to be analyzed will be considered. In this case, there is a problem that the mobile object cannot be detected since it is determined as a portion of a background image. On the other hand, when a time span for analyzing is increased for detecting a temporarily stationary object, the analysis is likely to be influenced by a change of a background due to an external noise such as illumination fluctuation, and therefore, there arises a problem that a temporary change of a background image other than the stationary object is often erroneously detected.

Patent Literature 1 aims at detecting a temporarily stationary object on the assumption that a background difference based on a long-term background model can express a true background at the time of obtaining an observed image. For this reason, it has been difficult to sufficiently suppress error detections in an environment in which a background gradually changes such as illumination fluctuation since there is a large difference from a true background at the time of obtaining an observed image in a long-term background model.

Some aspects of the present invention have been made in view of the above-described problems, and an object of the present invention is provide a detection system, a detection method, and a program storage medium which can preferably detect a mobile object.

Solution to Problem

A detection system of the present invention includes:
input means for receiving an input of a plurality of image frames having different capturing times;
calculation means for calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and detect means for detecting a first region in an image frame in which a difference between the second background model and the third background model is not less than a first threshold, and a difference between the first background model and the third background model is not less than second threshold times a difference between the first background model and the second background model.

A detection method of the present invention by a computer, includes:

receiving an input of a plurality of image frames having different capturing times;

calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and detecting a first region in an image frame in which a difference between the second background model and the third background model is not less than a first threshold, and a difference between the first background model and the third background model is not less than second threshold times a difference between the first background model and the second background model.

A program storage medium of the present invention for storing a program causing a computer to execute a processing of receiving an input of a plurality of image frames having different capturing times;

a processing of calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and a processing of detecting a first region in an image frame in which a difference between the second background model and the third background model is not less than a first threshold, and a difference between the first background model and the third background model is not less than second threshold times a difference between the first background model and the second background model.

In the present invention, a "unit", "means", "apparatus", or a "system" does not simply means a physical means, and also includes a software realizing a function of the "unit", "means", "apparatus", or "system". A function of one "unit", "means", "apparatus", or "system" may be realized by two or more physical means or apparatuses, or two or more functions of a "unit", "means", "apparatus", or a "system" may be realized by one physical means or apparatus.

Advantageous Effects of Invention

According to the present invention, a detection system, a detection method, and a program storage medium which can preferably detect a mobile object can be provided.

DESCRIPTION OF EMBODIMENTS

In the following, example embodiments according to the present invention will be described. In the description of the following explanation and drawings to be referred to, identical or similar configurations have identical or similar signs, respectively.

(1 First Exemplary Embodiment)

(1.1 Summary)

FIGS. 1 to 4 are diagrams illustrating a first example embodiment. Hereinafter, description will be made with reference to these drawings.

The present example embodiment relates to a detection system for detecting a mobile object which repeats moving or temporarily loitering such as a person or a vehicle from a picture captured by an imaging apparatus such as a camera. In particular, a detection system according to the present example embodiment preferably detects a mobile object such as a person or a vehicle even in cases in which an environment gradually changes such as a case of illumination fluctuation.

For this reason, the detection system according to the present example embodiment generates three background models which are each created based on an image frame at each time captured from a picture, and detects a mobile object using these background models. These three background models each have a different time span (time span to be analyzed) during which a plurality of image frames on which each background model is based are captured. Hereinafter, these three background models are referred to as a long-term background model, an intermediate-term background model, and a short-term background model.

When a mobile object is detected, the long-term background model and the short-term background model are compared with each other, and a pixel region having a difference can be detected as the mobile object. In this case, in order to detect the mobile object which may temporarily rest for some reason, the long-term background model is generated from an image frame having a sufficiently longer time span than a time for which the mobile object is assumed to rest.

Here, when a background (region excluding the mobile object) is an environment which does not change with time, the presence of the mobile object can be determined by simply detecting a difference between the long-term background model and the short-term background model (also including one image frame related to a processing time). However, when a background itself changes for a reason such as an illumination change, a large difference is generated between the short-term background model and the long-term background model with respect not only to a region where the mobile object is present but also to a region where the mobile object is absent. Therefore, it is difficult to specify a region of the mobile object by simply comparing the long-term background model with the short-term background model.

However, a difference of a background portion between the short-term background model and an intermediate-term background model, and a difference of a background portion between the intermediate-term background model and the long-term background model are small with respect to a region where the mobile object is absent. By taking an advantage of such characteristics, a detection system according to the present exemplary embodiment detects the mobile object by using the intermediate-term background model, by which a difference of time span of an object to be analyzed is smaller than a difference of time span between the long-term background model and the short-term background model. When the following two conditions are satisfied, the detection system according to the present exemplary embodiment detects a pixel region satisfying the condition as a region where a temporarily resting mobile object is present.

(Condition 1) A difference between the intermediate-term background model and the long-term background model is not less than a preset threshold.

(Condition 2) A difference between the short-term background model and the long-term background model is not less than preset constant times a difference between the short-term background model and the intermediate-term background model.

By this, with respect to a background region where a mobile object is absent, when a difference between the intermediate-term background model and the long-term background model is less than a threshold, Condition 1 is not satisfied, and therefore, the detection system can detect the region as a background.

When a mobile object stops for a certain time, while the resting mobile object largely influences the intermediate-term background model, the resting mobile object hardly influences the long-term background model. For this reason, there arises a difference not less than a preset threshold in a region of a mobile object between the intermediate-term background model and the long-term background model. That is, the above-described condition 1 is satisfied. As described above, since the mobile object largely influences the intermediate-term background model, the difference between the short-term background model and the intermediate-term background model is small. Therefore, there arises a difference between the short-term background model and the long-term background model which is not less than preset constant times a difference between the short-term background model and the intermediate-term background model. That is, Condition 2 is satisfied. By this, with respect to a region where a mobile object is present, Both Condition 1 and Condition 2 are satisfied, and therefore, the detection system can detect the region as a region where a mobile object is present.

Further, immediately after a temporarily rested mobile object starts to move and is absent, while an absent mobile object continues to largely influence the intermediate-term background model, the mobile object hardly influences the short-term background model. For this reason, a difference between the intermediate-term background model and the short-term background model is considerably large. Generally, a difference between the long-term background model and the short-term background model is small. This fails to satisfy Condition 2, the detection system can detect the region as a background.

In other words, the detection system according to the present exemplary embodiment can favorably detect a mobile object such as a temporarily resting person or vehicle even under an environment in which a background change due to an external noise such as an illumination change occurs.

In the present exemplary embodiment, the detection system 100 detects a mobile object by utilizing three background models, but is not limited thereto. Depending on a resting time of a mobile object to be detected, three background models, a short-term background model, an intermediate-term background model, and a long-term background model are extracted from generated four or more many background models, and a mobile object may be detected depending on a difference between the three background models.

(1.2 System Configuration)

Figure 2:
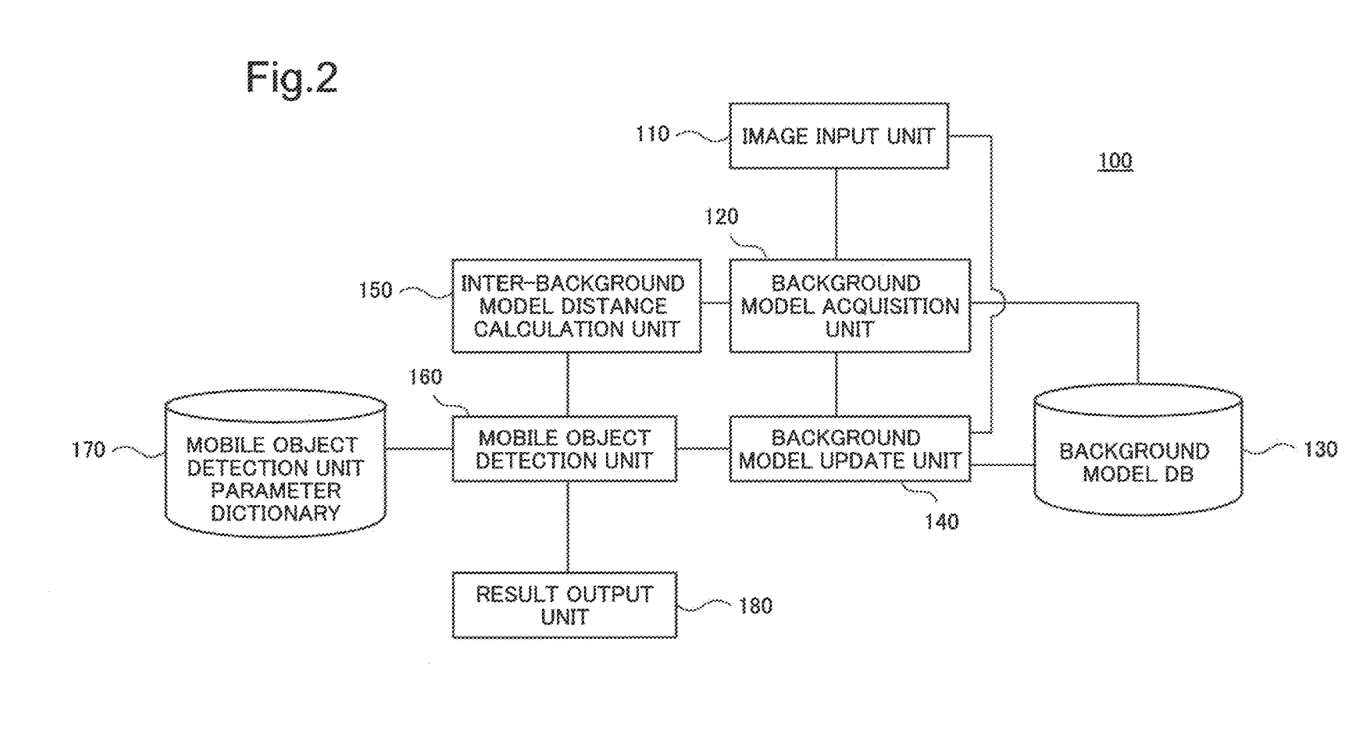
FIG. 2 is a functional block diagram schematically illustrating a detection system according to a first example embodiment.

Hereinafter, with reference to FIG. 2, a system configuration of the detection system according to the present exemplary embodiment will be described. FIG. 2 is a block diagram illustrating a system configuration of the detection system 100 according to the present exemplary embodiment. The detection system 100 as illustrated in FIG. 2 includes an image input unit 110, a background model acquisition unit 120, a background model database (DB)130, a background model update unit 140, an inter-background model distance calculation unit 150, a mobile object detection unit 160, a mobile object detection parameter dictionary 170, and a result output unit 180.

(1.2.1 Image Input Unit 110)

The image input unit 110 successively receives an input of image frames constituting a picture, i.e., image frames each having a different capturing time from an unillustrated photographing apparatus such as a camera. In other words, the image input unit 110 receives an input of an image frame at a processing time. Here, the image frame may be a monochrome image or may be a color image. When an image frame is a monochrome image, one value is contained in each pixel of the image frame. When an image frame is a color image, three values (color expression such as RGB or YCbCr) are contained in each pixel of the image frame. Alternatively, four or more values such as distance information obtained by a TOF (Time of Flight) camera or the like may be contained in each pixel in the image frame.

(1.2.2 Background Model Acquisition Unit 120)

The background model acquisition unit 120 reads an image frame input from the image input unit 110, and three background models, a short-term background model, an intermediate-term background model, and a long-term background model stored in a background model DB 130.

(1.2.3 Background Model DB 130)

The background model DB 130 stores a plurality of background models including the short-term background model, the intermediate-term background model, and the long-term background model each of whose analysis source image frames have different time spans of capturing times. Here, a variety of types of each background model may be employed, and for example, an image format similar to that of an image frame input from the image input unit 110 can be employed. In this case, for example, in the case of a background model of a monochrome image, each pixel includes one value, and in the case of a background model of a color image, each pixel includes three values.

Alternatively, a background model may also be a distribution function for pixels expressing, for each pixel, the likelihood of the pixel value of each of the source image frame thereof. Here, the distribution function may be a histogram, or a distribution function obtained by the sum of a plurality of Gaussian distributions.

As described above, the short-term background model, the intermediate-term background model, and the long-term background model have different time spans of capturing times of source image frames, respectively, and the time span becomes longer in the order of the short-term background model, the intermediate-term background model, and the long-term background model. In particular, regarding the short-term background model, an image frame input from the image input unit 110 may be employed as the short-term background model as it is. In this case, the short-term background model may be not controlled by the background model DB 130.

(1.2.4 Background Model Update Unit 140)

The background model update unit 140 generates the short-term background model, the intermediate-term background model, and the long-term background model taking into account an image frame at the time of processing (an image frame of the newest time) from an image frame at the time of processing acquired by the background model acquisition unit 120 and a background model store in the background model DB 130. The generated background model is stored in the background model DB 130.

Figure 1:
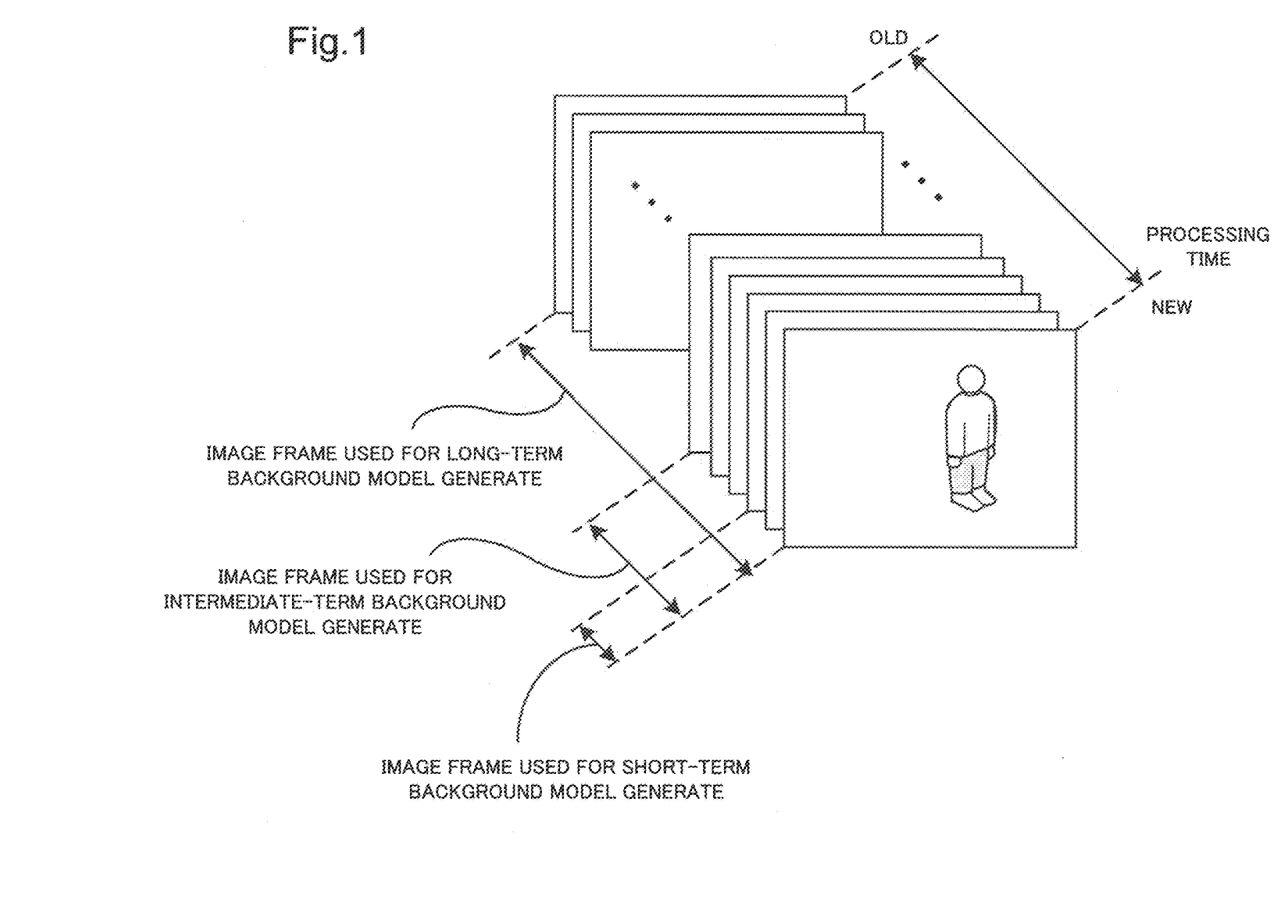
FIG. 1 is a diagram illustrating a relationship between a background model and an input image frame.

In the present example embodiment, the short-term background model, the intermediate-term background model, and the long-term background model have different time spans of source image frames, respectively. As illustrated in FIG. 1, the short-term background model is generated by image frames captured from the time of processing for a shortest time span, the intermediate-term background model is generated by image frames captured from the time of processing for a time span longer than the shortest time span, and the long-term background model is generated by image frames captured from the time of processing for a longest time span.

As a method of creating a background model, for example, an average value or a mode of a pixel value may be determined for each image frame for a time span defined for each background model. Alternatively, when a background model is a distribution function for each pixel as described above, a distribution function of pixel value of each image frame may be generated.

When Condition 2 of the above-described Conditions in which a mobile object detection value is used is not satisfied, it is considered that a temporarily rested mobile object is immediately after it starts to move, and that a mobile object largely influences the intermediate-term background model. Therefore, the background model update unit 140 may change an update method such that an influence (weight) of an input image near a processing time on which the intermediate-term background model has is large and such that the intermediate-term background model is closer to the short-term background model. By this, it is possible to quickly make the intermediate-term background model a state of background on which a mobile object is absent, and therefore, it is possible to suppress error detections.

In the present example embodiment, the short-term background model, the intermediate-term background model, and the long-term background model are described as those having different time spans of imaging times of source image frames, respectively, but are not limited thereto. The short-term background model, the intermediate-term background model, and the long-term background model each can be understood as a background model having different magnitude of an influence which an image frame at the time of processing (at the newest time) has. That is, in the short-term background model, an image frame at the time of processing has the largest influence, and in the long-term background model, an image frame at the time of processing has the smallest influence. Therefore, by introducing a concept of an updating coefficient instead of using a concept of a time span, the short-term background model, the intermediate-term background model, and the long-term background model may be a different updating coefficient when a background model is updated using an image frame input from the image input unit 110.

In this case, for example, when a background model is $I_{bg}$, and an image frame input from the image input unit 110 is I, by the following formula:

$$I_{bg} \leftarrow (1-a) \times I_{bg} + a \times I, \qquad \text{[Math. 1]}$$

the background model can be updated. In this formula, a is a constant of from 0 to 1, and a short-term background model, an intermediate-term background model, and a long-term background model have different values. When the constant of the short-term background model, the intermediate-term background model, and the long-term background model are $a_1$, $a_2$, and $a_3$, the relationship:

$$0 \leq a_3 < a_2 < a_1 \leq 1 \qquad \text{[Math. 2]}$$

is satisfied. When $a_1=1$, the short-term background model is always replaced with a new image frame. When $a_3=0$, the long-term background model means that a fixed background model is used. Even when a fixed background model is used for a background model, updating is possible by a similar manner.

(1.2.5 Inter-Background Model Distance Calculation Unit 150)

The inter-background model distance calculation unit 150 calculates distance values which are differences between three inter-background models acquired by the background model acquisition unit 120 represented by numeral values for each pixel. Specifically, the inter-background model distance calculation unit 150 calculates, for each pixel, a distance between the short-term background model and the intermediate-term background model, a distance between the short-term background model and the long-term background model, and a distance between the intermediate-term background model and the long-term background model.

For example, when a background model is in an image format, the inter-background model distance calculation unit 150 may calculate a difference value or a difference vector of the pixel value of each pixel, and then calculate the absolute value of the size as the size thereof. When a background model has a plurality of values for each pixel, for example, when the background model is in a color image format such as RGB, YCbCr, or HSV, the calculation unit may calculate the difference value for each value, and then define the sum of the absolute values of the difference values as a distance of each pixel. Alternatively, the calculation unit may extract a neighboring partial image such as a neighboring 3×3 image or a 5×5 image centered on a pixel position to be processed, and then, regarding pixel values of the extracted two neighboring partial images as two vectors, respectively, may calculate a distance or a normalized correlation r between two vectors. In this case, for example, when a distance is calculated by neighboring 3×3 images using a background model in a monochrome image format, a distance between 9-order vectors is to be calculated. When a distance is calculated by neighboring 5×5 images using a background model in a RGB color image format, a distance between 75-order (5×5×3) vectors is to be calculated.

When a normalized correlation r is used as a distance, the maximum value of the correlation r is 1, and the closer the r is to 1, the closer two vectors are to identical. Therefore, in order to convert to a distance scale, 1-r can be used as a distance value. Alternatively, a distance may be calculated after the pre-processing of the above-described neighboring partial image by an edge enhancement filter or the like.

When a distribution function such as a histogram is used for a background model, the inter-background model distance calculation unit 150 can calculate a distance of an inter-background model by using a histogram distance calculation method such as the area of common part of two histograms or the Bhattacharyya distance.

In the above-described method, the inter-background model distance calculation unit 150 is described as one which calculates a distance for each pixel, but is not limited thereto. For example, the inter-background model distance calculation unit 150 may use a method such as calculating, after dividing an image into some region units such as meshes, a distance for each of the mesh unit. A distance may have a negative value.

Each of the short-term background model, the intermediate-term background model, and the long-term background model may be a different format. For example, the short-term background model may be an image format, and the intermediate-term background model may be a distribution function for each pixel. In this case, as a method of calculating a distance, for example, a histogram of a normal distribution with a preset standard deviation centered on a pixel value stored in the short-term background model is generated. A method of calculating, by regarding the histogram as a distribution function in the short-term background model, a distance by comparing the histogram with a histogram of the intermediate-term background model may be employed. Alternatively, a distance may be calculated by comparing the intermediate-term background model in an image format which is formed as a set of average values each of which is calculated from a distribution function of each pixel of the intermediate-term background model for each pixel with the short-term background model.

(1.2.6 Mobile Object Detection Unit 160)

The mobile object detection unit 160 determines whether each pixel is included in a region where a mobile object appears or not by using information of a distance between background models, and a parameter stored in the mobile object detection parameter dictionary 170. More specifically, the mobile object detection unit 160 determines that a pixel to be processed is included in a region where a mobile appears when the following two Conditions are satisfied.

(Condition 1) A distance between the intermediate-term background model and the long-term background model is not less than a preset threshold.

(Condition 2) A distance between the short-term background model and the long-term background model is not less than preset constant times a distance between the short-term background model and the intermediate-term background model.

Here, the "preset threshold" in Condition 1 and the "preset constant times" in Condition 2 are the parameters included in the mobile object detection parameter dictionary 170.

In order to detect a temporarily resting mobile object, the long-term background model is generated from image frames in a time span longer than a time during which a mobile object is assumed to rest. In environments in which a background region where a mobile object is absent does not change, whether a mobile object is present or not can be determined by simply comparing the long-term background model with the short-term background model (or an image frame at a processing time itself). However, when a background region also changes with time due to an influence of an external noise such as an illumination change, there arises a large difference between the short-term background model and the long-term background model with respect not only to a region where a mobile object is present but also to a background region, by simply comparing the short-term background model with the long-term background model. That is, it is difficult to detect a region of a mobile object.

However, with respect to a difference between the short-term background model and the intermediate-term background model, and a difference between the intermediate-term background model and the long-term background model, in which a difference between time windows of objects to be analyzed is small, an influence of an external noise such as an illumination change is small, and therefore, a distance value in a background region is small.

When a background slowly changes, if a mobile object is absent, the short-term background model is the closest to a background at a processing time, and the intermediate-term background model is second closest to a background at a processing time. That is, the long-term background model is farthest to a background at a processing time. That is, a distance between the short-term background model and the intermediate-term background model is smaller than a value obtained by multiplying a distance between the short-term background model and the long-term background model by a constant not larger than 1. The constant changes depending on a time span in which each background model performs analysis; when a time span of the intermediate-term background model is close to a time span of the long-term background model, the constant is a value close to 1, and when a difference between a time span of the intermediate-term background model and a time span of the long-term background model is large, the constant is a value smaller than 1.

A detection method using the above-described Condition 1 and Condition 2 by the mobile object detection unit 160 utilizes the above-described characteristics. With respect to a background region, when a distance between the intermediate-term background model and the long-term background model is small (not larger than a threshold), the mobile object detection unit 160 can determine a pixel as a background region by Condition 1.

When a mobile object temporarily rests, while the resting mobile object largely influences the intermediate-term background model, the resting mobile object does not largely influence the long-term background model, and therefore, a distance between the intermediate-term background model and the long-term background model is not less than a preset threshold. That is, Condition 1 is satisfied. In addition, since a mobile object largely influences the intermediate-term background model, a distance from the short-term background model is small. Therefore, a distance between the short-term background model and the long-term background model is not less than preset constant times a distance between the short-term background model and the intermediate-term background model. That is, Condition 2 is also satisfied. Therefore, the mobile object detection unit 160 can favorably extract a region where a mobile object is present.

While, immediately after a temporarily rested mobile object starts to move, a mobile object still continues to largely influence the intermediate-term background model, a mobile object hardly influences the short-term background model. In other words, there arises a large distance between the short-term background model and the intermediate-term background model. This fails to satisfy Condition 2, the mobile object detection unit 160 does not detect a mobile object in an image frame at a processing time.

In addition, in order to detect a mobile object which continues to move (mobile object which does not rest), a threshold for detecting a moving mobile object may be prepared in the mobile object detection parameter dictionary 170. In this case, when a distance between the intermediate-term background model and the short-term background model is not less than the threshold, the mobile object detection unit 160 may detect a region (a region with not less than a threshold) of the mobile object as a region where the moving mobile object is present. By this, a mobile object such as a person or a vehicle which temporarily moves or rests repeatedly can always be detected.

(1.2.7 Result Output Unit 180)

The result output unit 180 outputs information of a mobile object obtained by the mobile object detection unit 160. A variety of methods of outputting such information are acceptable, and for example, such information can be output as a binary image in which a mobile object region is 1 and the other than region is 0. Alternatively, a joining segment may be generated by performing a labeling processing on the binary image, and a circumscribed rectangle may be output for each joining segment.

Alternatively, a case in which, by using a detection method by the detection system according to the present exemplary embodiment, since a distance between the short-term background model and the intermediate-term background model is large, a detected mobile object is output as a moving mobile object, and since a distance between the intermediate-term background model and the long-term background model is large, a detected mobile object is output as a mobile object which is temporarily loitering (resting) may also be taken into account. In this case, for example, an image may be output in a three-value in which the pixel value of a pixel detected as a moving mobile object is set to 1, the pixel value of a pixel detected as a temporarily resting mobile object is set to 2, and the pixel value of a pixel other than the above is set to 0. As the case may be, both a distance between the short-term background model and the intermediate-term background model, and a distance between the intermediate-term background model and the long-term background model may be large. In such cases, the pixel value of the moving object may be output as 1. Alternatively, after making a four-valued output available, a pixel value 3 may be output as a pixel which cannot be determined.

(1.3 Processing Flow)

Figure 3:
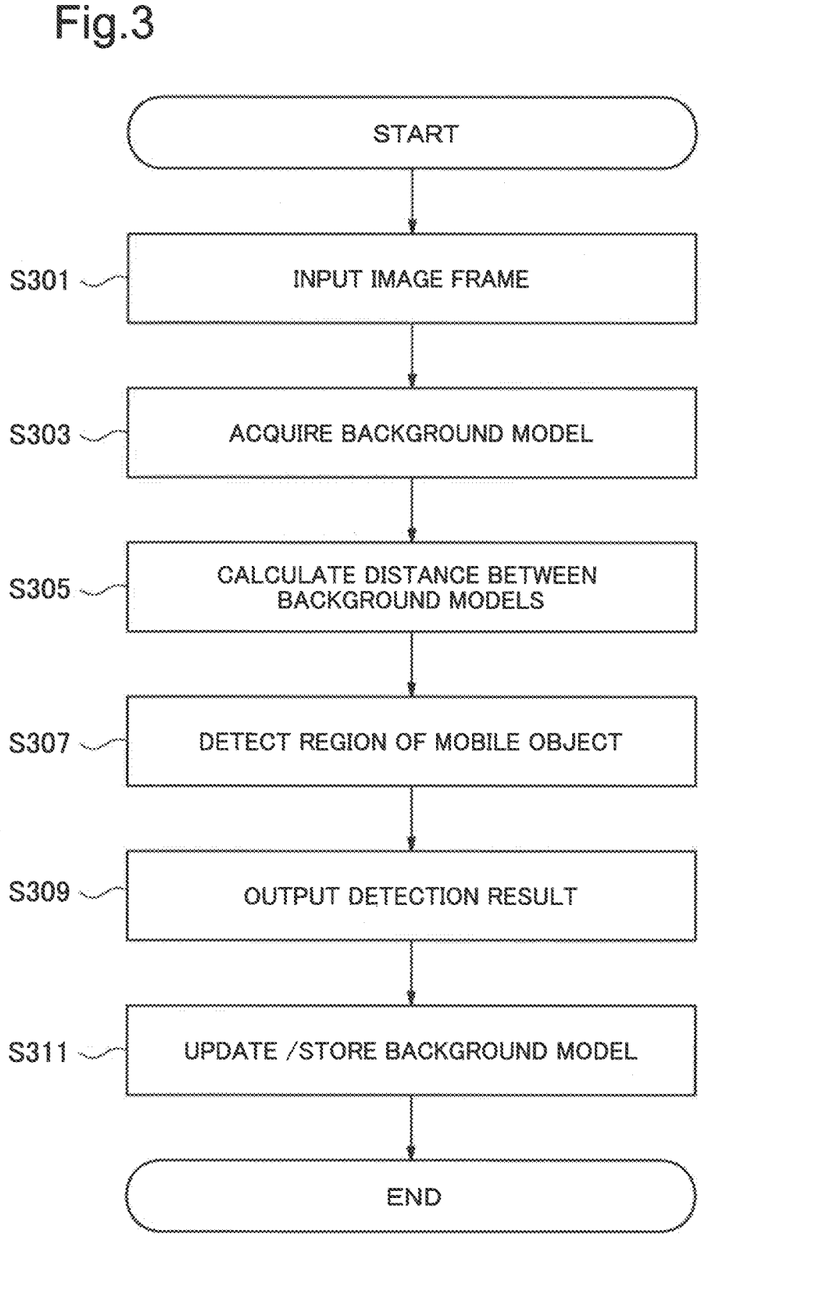
FIG. 3 is a flow chart illustrating a processing flow of a detection system illustrated in FIG. 2.

Hereinafter, a processing flow of the detection system 100 will be described with reference to FIG. 3. FIG. 3 is a flow chart illustrating a processing flow of the detection system 100 according to the present exemplary embodiment.

Each processing step in the following may be executed in an arbitrary sequence or in parallel within the scope of not creating any inconsistencies in the processing contents, and another step may be added between the processing steps. Further, a step described as one step for the sake of convenience may be executed in a plurality of sub-steps, and steps described as sub-steps for the sake of convenience may be executed as one step.

The image input unit 110 receives an input of a new image frame (image frame at the time of processing) (S301). The background model acquisition unit 120 reads a short-term background model, an intermediate-term background model, and a long-term background model stored in the background model DB130 (S303).

The inter-background model distance calculation unit 150 calculates, for each pixel, a distance between the short-term background model and the intermediate-term background model, a distance between the intermediate-term background model and the long-term background model, and a distance between the short-term background model and the long-term background model (S305). The mobile object detection unit 160 determines, with respect to a distance between the background models calculated by the inter-background model distance calculation unit 150, whether each pixel is a region on which a mobile object appears or not by determining whether the above-described Condition 1 and Condition 2 are satisfied or not (S307). The result output unit 180 outputs a detection result (S309).

The background model update unit 140 updates each background model by using an image frame input from the image input unit 110, and stores the updated background model in the background model DB 130 (S311).

(1.4 Specific Example of Hardware Configuration)

Hereinafter, with reference to FIG. 4, one example of a hardware configuration when the above-described detection system 100 is realized by a computer will be described. Functions of the detection system 100 may also be realized by a plurality of computers.

Figure 4:
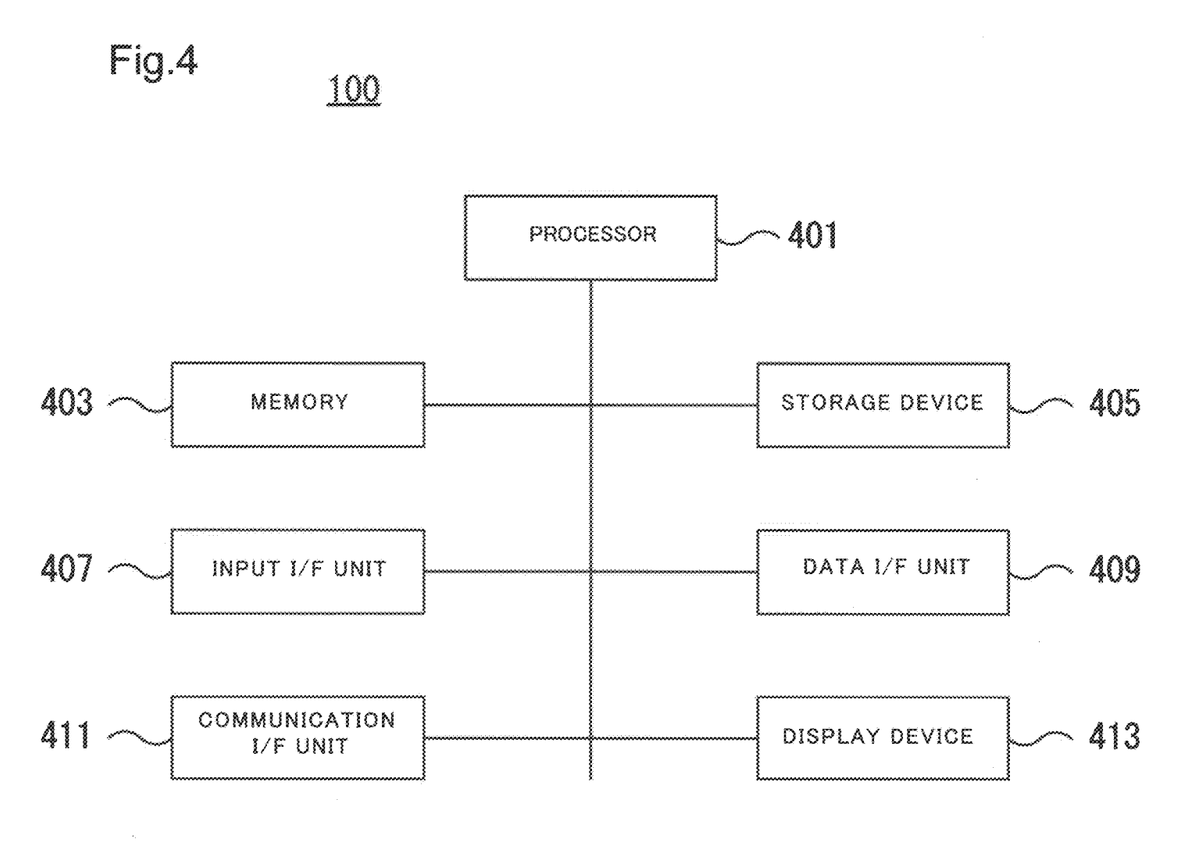
FIG. 4 is a block diagram illustrating a hardware configuration which can implement a detection system shown in FIG. 2.

As illustrated in FIG. 4, the detection system 100 includes a processor 401, a memory 403, a storage apparatus 405, an input interface (I/F) unit 407, a data I/F unit 409, a communication I/F unit 411, and a display apparatus 413.

The processor 401 controls a variety of processings of the detection system 100 by executing a program stored in the memory 403. For example, processings related to the image input unit 110, the background model acquisition unit 120, the background model update unit 140, the inter-background model distance calculation unit 150, the mobile object detection unit 160, and the result output unit 180 illustrated in FIG. 2 can be realized as a program which is temporarily stored in the memory 403 and operates mainly on the processor 401.

The memory 403 is, for example, a storage medium such as RAM (Random Access Memory). The memory 403 temporarily stores a program code which is executed by the processor 401 or a data required when a program is executed.

The storage apparatus 405 is, for example, a non-volatile storage medium such as a hard disk or a flash memory. The storage apparatus 405 can store a variety of programs for realizing functions of an operating system, or the image input unit 110, the background model acquisition unit 120, the background model update unit 140, the inter-background model distance calculation unit 150, the mobile object detection unit 160, and the result output unit 180, or a variety of data including the background models DB 130, and the mobile object detection parameter dictionary 170. A program or data stored in the storage apparatus 405 is referred to by the processor 401 when it is loaded to the memory 403 as required.

An input I/F unit 407 is a device for receiving an input from a user. Specific examples of the input I/F unit 407 include a keyboard, a mouse, or a touch panel. The input I/F unit 407 may be connected to the detection system 100 via, for example, an interface such as a USB (Universal Serial Bus).

The data I/F unit 409 is a device for inputting data from outside the detection system 100. Specific examples of the data I/F unit 409 include a drive device for reading data stored in a variety of storage media. The data I/F unit 409 may be provided outside the detection system 100. In this case, the data I/F unit 409 is connected to the detection system 100 via, for example, an interface such as a USB.

The communication I/F unit 411 is a device for performing data communication with an apparatus outside the detection system 100 such as a photographing apparatus (a video camera, a surveillance camera, or a digital camera) by wire or wirelessly. The communication I/F unit 411 may be provided outside the detection system 100. In this case, the communication I/F unit 411 is connected to the detection system 100 via, for example, an interface such as a USB.

The display apparatus 413 is a device for displaying a detection result of a mobile object output from, for example, the result output unit 180. Specific examples of the display apparatus 413 include a liquid crystal display or an organic EL (Electro-Luminescence) display. The display apparatus 413 may be provided outside the detection system 100.

In this case, the display apparatus 413 is connected to the detection system 100 via, for example, a display cable.

(1.5 Effect of Present Example Embodiment)

As described above, the detection system 100 according to the present exemplary embodiment can favorably detect particularly a temporarily resting mobile object by detecting differences between the short-term background model, the intermediate-term background model, and the long-term background model and by using the differences.

(2 Second Exemplary Embodiment)

Figure 5:
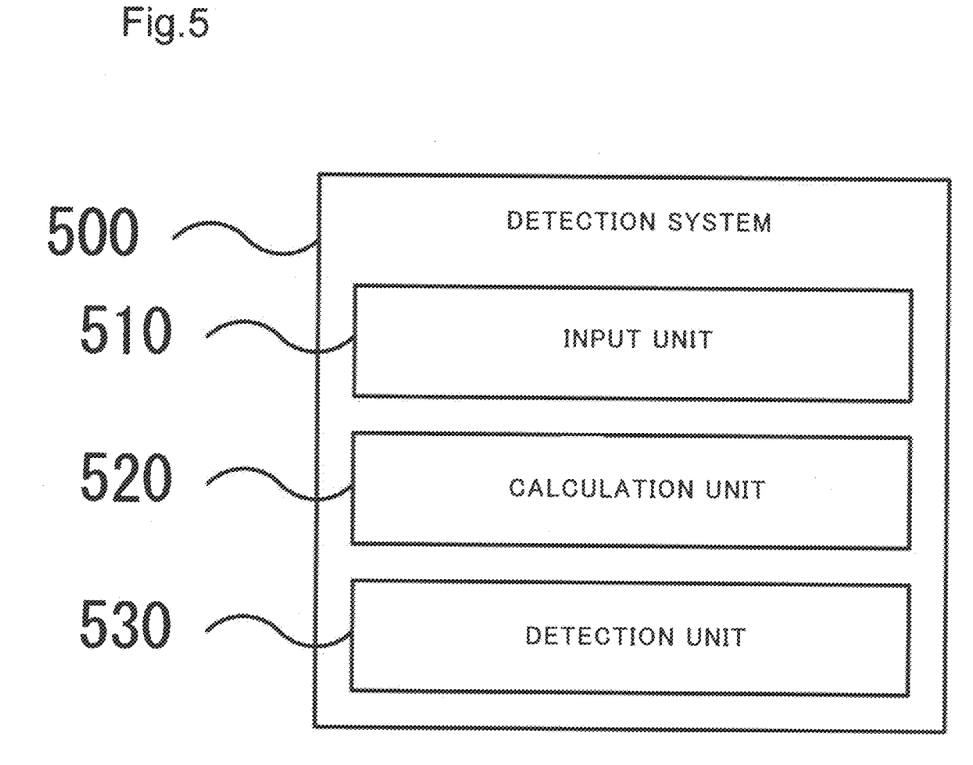
FIG. 5 is a functional block diagram schematically illustrating a detection system according to a second example embodiment.

Hereinafter, a second example embodiment will be described with reference to FIG. 5. FIG. 5 is a block diagram illustrating a configuration of a function of a detection system 500. As illustrated in FIG. 5, the detection system 500 includes an input unit 510, a calculation unit 520, and a detection unit 530.

The input unit 510 receives, for example, an input of a plurality of image frames having different capturing times constituting a picture.

The calculation unit 520 calculates differences between the first background model generated based on an image frame at the time of processing, the second background model in which an influence of an image frame at the time of processing is smaller than that of the first background model, and the third background model in which an influence of an image frame at the time of processing is smaller than that of the second background model.

The detection unit 530 detects a first region in an image frame in which a difference between the second background model and the third background model is not less than a first threshold, and a difference between the first background model and the third background model is second threshold times a difference between the first background model and the second background model.

By employing the above-described implementation, the detection system 500 according to the present example embodiment can preferably detect a mobile object.

(3 Supplementary Notes)

The configurations of the example embodiments described above may be combined or some configuration may be replaced with. The configuration of the present invention is not limited only to the example embodiments described above, and a variety of changes can be made without departing from the scope of the present invention.

Some or all of the example embodiments described above may also be described as the following Supplementary notes, but the present invention is not limited to the following. A program according to the present invention may be a program which causes a computer to execute each operation described in each of the above-described example embodiments.

(Supplementary Note 1)

A detection system comprising:

input means for receiving an input of a plurality of image frames having different capturing times;

calculation means for calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and detect means for detecting a first region in an image frame in which a difference between the second background model and the third background model is not less than a first threshold, and a difference between the first background model and the third background model is second threshold times a difference between the first background model and the second background model.

(Supplementary Note 2)

The detection system according to Supplementary Note 1, wherein the first background model, the second background model, and the third background model have a different time span of capturing of image frames to be considered.

(Supplementary Note 3)

The detection system according to Supplementary Note 1 or Supplementary Note 2, wherein the detect means detects a second region in the image frame in which a difference between the first background model and the second background model is not less than a third threshold.

(Supplementary Note 4)

The detection system according to any one of Supplementary Notes 1 to 3, further comprising output means for outputting the first region and the second region by discriminating them.

(Supplementary Note 5)

The detection system according to any one of Supplementary Notes 1 to 4, wherein an influence of an image frame at the processing time in the second background model is changeable.

(Supplementary Note 6)

The detection system according to any one of Supplementary Notes 1 to 5, wherein an influence that the first region in an image frame at the processing time has on the second background model is smaller than an influence that other regions have on the second background model.

(Supplementary Note 7)

A detection method causing a computer to execute:

a step of receiving an input of a plurality of image frames having different capturing times;

a step of calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and a step of detecting a first region in an image frame in which a difference between the second background model and the third background model is not less than a first threshold, and a difference between the first background model and the third background model is second threshold times a difference between the first background model and the second background model.

(Supplementary Note 8)
The detection method according to Supplementary Note 7, wherein
the first background model, the second background model, and the third background model have a different time span of capturing of image frames to be considered.

(Supplementary Note 9)
The detection method according to Supplementary Note 7 or Supplementary Note 8, wherein
the detect means detects a second region in the image frame in which a difference between the first background model and the second background model is not less than a third threshold.

(Supplementary Note 10)
The detection method according to any one of Supplementary Notes 7 to 9, further comprising output means for outputting the first region and the second region by discriminating them.

(Supplementary Note 11)
The detection method according to any one of Supplementary Notes 7 to 10, wherein
an influence of an image frame at the processing time in the second background model is changeable.

(Supplementary Note 12)
The detection method according to one of Supplementary Note 11, wherein
an influence that the first region in an image frame at the processing time has on the second background model is smaller than an influence that other regions have on the second background model.

(Supplementary Note 13)
A program storage medium for storing a program causing a computer to execute
a processing of receiving an input of a plurality of image frames having different capturing times;
a processing of calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and
a processing of detecting a first region in an image frame in which a difference between the second background model and the third background model is not less than a first threshold, and a difference between the first background model and the third background model is second threshold times a difference between the first background model and the second background model.

(Supplementary Note 14)
The program according to Supplementary Note 13, wherein
the first background model, the second background model, and the third background model have a different time span of capturing of image frames to be considered.

(Supplementary Note 15)
The program according to Supplementary Note 13 or Supplementary Note 14, wherein
the detect means detects a second region in the image frame in which a difference between the first background model and the second background model is not less than a third threshold.

(Supplementary Note 16)
The program according to any one of Supplementary Notes 13 to 15, further comprising output means for outputting the first region and the second region by discriminating them.

(Supplementary Note 17)
The program according to any one of Supplementary Notes 13 to 16, wherein
an influence of an image frame at the processing time in the second background model is changeable.

(Supplementary Note 18)
The program according to one of Supplementary Note 17, wherein
an influence that the first region in an image frame at the processing time has on the second background model is smaller than an influence that other regions have on the second background model.

The present invention has been described by way of example embodiments as described above as exemplary examples. However, the present invention is not limited to the above-described example embodiments. In other words, a variety of aspects which can be understood by those skilled in the art can be applied to the present invention without departing from the scope of the present invention.

This application claims the priority based on Japanese Patent Application No. 2014-115207 filed on Jun. 3, 2014, the entire disclosure of which is incorporated herein by reference.

REFERENCE SIGNS LIST

100: Detection system
110: Image input unit
120: Background model acquisition unit
130: Background model database
140: Background model update unit
150: Inter-background model distance calculation unit
160: Mobile object detection unit
170: Mobile object detection parameter dictionary
180: Result output unit
401: Processor
403: Memory
405: Storage apparatus
407: Input interface unit
409: Data interface unit
411: Communication interface unit
413: Display apparatus
500: Detection system
510: Input unit
520: Calculation unit
530: Detection unit

What is claimed is:
1. A detection system comprising:
a memory storing instructions; and
one or more processors configured to process the instructions to implement:
an input unit configured to receive an input of a plurality of image frames having different capturing times;
a calculation unit configured to calculate differences between a first background model generated based on an image frame at the time of processing, a second background model in which an influence of an image frame at the time of processing is smaller than that of the first background model, and a third background model in which an influence of an image frame at the time of processing is smaller than that of the second background model; and a detection unit configured to detect a first region in an image frame in which a difference between the second background model and the third background model is not less than a first threshold, and a difference between the first background model and the third background model is not less than second threshold times a difference between the first background model and the second background model.

2. The detection system according to claim 1, wherein the first background model, the second background model, and the third background model have a different time span of capturing of image frames to be considered.

3. The detection system according to claim 2, wherein the one or more processors are further configured to process the instructions to implement a detection unit configured to detect a second region in the image frame in which a difference between the first background model and the second background model is not less than a third threshold.

4. The detection system according to claim 2, wherein the one or more processors are further configured to process the instructions to implement an output unit configured to output the first region and the second region by discriminating them.

5. The detection system according to claim 2, wherein an influence of an image frame at the processing time in the second background model is changeable.

6. The detection system according to claim 1, wherein the one or more processors are further configured to process the instructions to implement a detection unit configured to detect a second region in the image frame in which a difference between the first background model and the second background model is not less than a third threshold.

7. The detection system according to claim 6, wherein the one or more processors are further configured to process the instructions to implement an output unit configured to output the first region and the second region by discriminating them.

8. The detection system according to claim 6, wherein an influence of an image frame at the processing time in the second background model is changeable.

9. The detection system according to claim 1, wherein the one or more processors are further configured to process the instructions to implement an output unit configured to output the first region and the second region by discriminating them.

10. The detection system according to claim 9, wherein an influence of an image frame at the processing time in the second background model is changeable.

11. The detection system according to claim 1, wherein an influence of an image frame at the processing time in the second background model is changeable.

12. The detection system according to claim 11, wherein an influence that the first region in an image frame at the processing time has on the second background model is smaller than an influence that other regions have on the second background model.

13. The detection system according to claim 1, wherein the one or more processors are further configured to process the instructions to implement an output unit configured output information corresponding to the first region.

14. A detection method executed by a computer, comprising:
receiving an input of a plurality of image frames having different capturing times;
calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and
detecting a first region in an image frame in which a difference between the second background model and the third background model is not less than a first threshold, and a difference between the first background model and the third background model is not less than second threshold times a difference between the first background model and the second background model.

15. A computer-readable non-transitory storage medium for storing a program causing a computer to execute function of:
receiving an input of a plurality of image frames having different capturing times;
calculating differences between a first background model generated based on an image frame at the time of processing, a second background model in which an influence of an image frame at the time of processing is smaller than that of the first background model, and a third background model in which an influence of an image frame at the time of processing is smaller than that of the second background model; and
detecting a first region in an image frame in which a difference between the second background model and the third background model is not less than a first threshold, and a difference between the first background model and the third background model is not less than second threshold times a difference between the first background model and the second background model.

* * * * *